(12) United States Patent
Nagano et al.

(10) Patent No.: US 8,488,649 B2
(45) Date of Patent: Jul. 16, 2013

(54) CODE CONVERTING APPARATUS, RECEIVER, AND CODE CONVERTING METHOD

(75) Inventors: Takafumi Nagano, Tokyo (JP); Takashi Iwamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 386 days.

(21) Appl. No.: 12/863,779

(22) PCT Filed: Jan. 30, 2008

(86) PCT No.: PCT/JP2008/051363
§ 371 (c)(1),
(2), (4) Date: Jul. 21, 2010

(87) PCT Pub. No.: WO2009/096005
PCT Pub. Date: Aug. 6, 2009

(65) Prior Publication Data
US 2010/0290505 A1 Nov. 18, 2010

(51) Int. Cl.
*H04B 1/00* (2006.01)
(52) U.S. Cl.
USPC .......... 375/142; 375/141; 375/130; 375/140; 375/147; 375/143
(58) Field of Classification Search
USPC .................. 375/142, 141, 130, 140, 147, 143
See application file for complete search history.

(56) References Cited

U.S. PATENT DOCUMENTS 5,920,591 A * 7/1999 Fukasawa et al. ............ 375/142
6,373,859 B1 * 4/2002 Jedwab et al. ................ 370/479

(Continued)

FOREIGN PATENT DOCUMENTS

JP 2007 71844 3/2007
WO 2007 020693 2/2007

OTHER PUBLICATIONS

Asami, Hiroai et al., Speed-up of coherent integration in high sensitivity GPS signal processing, IEICE, Technical Report, SANE 2005-99, pp. 19-24, (Feb. 20, 2006).

(Continued)

*Primary Examiner* — Kenneth Lam
(74) *Attorney, Agent, or Firm* — Oblon, Spivak, McClelland, Maier & Neustadt, L.L.P.

(57) ABSTRACT

A code converting apparatus is designed to estimate the incoming time and the like of a signal modulated by a spreading sequence composed of m elements in a set A having n kinds of symbols as elements accurately. A symbol sequence memory section 102 stores a converted sequence of symbols obtained by concatenating consecutive 2d symbols at the center of each sequence pattern $p_i$ composed of 4d elements in the set A. The converted sequence of symbols is structured so that d symbol immediately preceding the 2d symbols and d symbol immediately following the 2d symbols are identical to d symbol immediately preceding corresponding 2d symbols and d symbol immediately following the corresponding 2d symbols of a corresponding sequence pattern. A symbol sequence specifying section 103 specifies a matching sequence pattern for every consecutive 2d symbols in a symbol sequence obtained by assigning a symbol to the signal in a coding cycle of the spreading sequence. A signal generating section 104 adds a portion to which the 2d symbols are assigned of the signal. A signal converting section 105 concatenates each pattern signal added for each sequence pattern, in an order equivalent to an order of the 2d symbols at the center of each sequence pattern concatenated in the converted sequence of symbols.

11 Claims, 7 Drawing Sheets

U.S. PATENT DOCUMENTS

| | | | |
|---|---|---|---|
| 6,714,582 B2* | 3/2004 | Nakamura et al. | 375/141 |
| 7,538,725 B2 | 5/2009 | Iwamoto et al. | |
| 7,711,036 B2* | 5/2010 | Hafuka | 375/149 |
| 2003/0081655 A1* | 5/2003 | Nakamura et al. | 375/141 |
| 2004/0208236 A1 | 10/2004 | Fenton | |

OTHER PUBLICATIONS

U.S. Appl. No. 12/026,902, filed Feb. 6, 2008, Nagano, et al.

* cited by examiner

FIG. 3

$i = 1;$
*for k from 1 to (s - 1)*
 $p_i = q_k \cdot q_k; i = i + 1;$

*for m from (k + 1) to (s - 1)*
  $p_i = q_k \cdot q_m; i = i + 1;$
  $p_i = q_m \cdot q_k; i = i + 1;$
 *end*
 $p_i = q_k \cdot q_s; i = i + 1;$
 $p_i = q_s \cdot q_{k+1}; i = i + 1;$
*end*
$p_i = q_s \cdot q_1;$

CODE CONVERTING APPARATUS, RECEIVER, AND CODE CONVERTING METHOD

TECHNICAL FIELD

The present invention relates to a code converting apparatus, a receiver, and a code converting method.

BACKGROUND ART

An effective use of despreading in estimating the incoming time or direction of a spread spectrum signal may result in an increase in the number of samples, and lead to an increase in the amount of calculation. An example is an estimation of multipath in a GPS (Global Positioning System) signal. U.S. Patent Publication Number 2004/0208236, for example, discloses a multipath estimation directed to reduce the number of samples by extracting and analyzing the waveform of a portion of a spreading sequence (i.e., a code) where a symbol changes to an inverted symbol (hereinafter, referred to as a "portion of symbol inversion"), like Vision Correlator (Registered Trademark).

DISCLOSURE OF THE INVENTION

Problems to be solved by the Invention

In the conventional art described above, the waveform of a portion of symbol inversion of a spreading sequence in a received code modulation signal is extracted, and an averaged waveform is analyzed. There is a problem that an extracted waveform may include the waveform of a different symbol on each end due to a code delay, and thus accuracy of estimation is reduced. There is another problem in that the symbols of the extracted waveform at both ends are different, and thus the extracted waveform cannot be treated as a periodic continuous function, which makes analysis difficult. There is yet another problem in that the conventional art exclusively uses the portion of symbol inversion and does not use a portion of consecutive identical symbols, and thus sensitivity (i.e., accuracy) is reduced.

An object of the present invention is to estimate the incoming time or direction of a received code modulation signal accurately with less calculation. The object may be achieved by converting a received code modulation signal into a signal having a small number of samples by using a symbol sequence generated by concatenating sequence patterns representing parts of a spreading sequence while the sequence patterns are made to overlap with each other, for example.

Means to Solve the Problems

A code converting apparatus according to one aspect of the present invention may include:

a signal inputting section configured to input a first signal sampled in a predetermined sampling cycle from a modulation signal modulated by a spreading sequence composed of m elements in a set A having n kinds of symbols as elements where $m \geq 4d$, $d \geq 1$, $n \geq 2$, and m, d and n are integers;

a symbol sequence memory section configured to store a converted sequence of symbols obtained by concatenating consecutive 2d symbols at the center of each of $n^{4d}$ kinds of sequence patterns, each sequence pattern being composed of 4d elements in the set A, the converted sequence of symbols being structured so that d symbol immediately preceding the 2d symbols and d symbol immediately following the 2d symbols are identical to d symbol immediately preceding corresponding 2d symbols and d symbol immediately following the corresponding 2d symbols of a corresponding sequence pattern;

a symbol sequence specifying section configured to specify a sequence pattern matching a partial sequence composed of the 2d symbols, the d symbol immediately preceding the 2d symbols and the d symbol immediately following the 2d symbols, among the sequence patterns, for every consecutive 2d symbols included in an input symbol sequence $x_1 x_2 \ldots x_m$ obtained by assigning a symbol to the first signal inputted by the signal inputting section in a coding cycle of the spreading sequence;

a signal generating section configured to generate a pattern signal for each sequence pattern specified by the symbol sequence specifying section for every consecutive 2d symbols included in the input symbol sequence, by adding a partial signal that is a portion to which the 2d symbols are assigned of the first signal inputted by the signal inputting section; and a signal converting section configured to generate a second signal by concatenating each pattern signal generated by the signal generating section for each sequence pattern, in an order equivalent to an order of the 2d symbols at the center of each sequence pattern concatenated in the converted sequence of symbols stored in the symbol sequence memory section.

The symbol sequence memory section may set the sequence patterns $p_i = b_{i,1} b_{i,2} \ldots b_{i,4d}$ where $i = 1, 2, \ldots, n^{4d}$ so that $b_{k,2d+1} b_{k,2d+2} \ldots b_{k,4d} = b_{k+1,1} b_{k+1,2} \ldots b_{k+1,2d}$ where $k = 1, 2, \ldots, n^{4d} - 1$ and $$b_{n^{4d},2d+1} b_{n^{4d},2d+2} \ldots b_{n^{4d},4d} = b_{1,1} b_{1,2} \ldots b_{1,2d}$$

and store the converted sequence of symbols, $$c_1 c_2 \ldots c_{2dn^{4d}} = b_{1,d+1} b_{1,d+2} \ldots b_{1,3d} b_{2,d+1} \ldots b_{2,3d} \ldots b_{n^{4d},d+1} \ldots b_{n^{4d},3d}$$

obtained by concatenating the 2d symbols at the center of each of the sequence patterns $p_i$ in an ascending order of i.

The signal inputting section may input the first signal sampled in the predetermined sampling cycle from the modulation signal modulated by the spreading sequence composed of m elements in the set $A = \{-1, 1\}$ where $n = 2$.

The symbol sequence memory section may set the sequence patterns which are the permutated sequence patterns of $p_i = b_{i,1} b_{i,2} b_{i,3} b_{i,4}$ where $b_{i,1} = 1$, $i = 1, 2, \ldots, 8$, and $d = 1$ so that $b_{k,3} b_{k,4} = b_{k+1,1} b_{k+1,2}$ where $k = 1, 2, \ldots, 7$ and $b_{8,3} b_{8,4} = b_{1,1} b_{1,2}$, while allowing inversion (i.e., a replacement with $p_i = -b_{i,1} -b_{i,2} -b_{i,3} -b_{i,4}$), and store the converted sequence of symbols $c_1 c_2 \ldots c_{16} = b_{1,2} b_{1,3} b_{2,2} b_{2,3} \ldots b_{8,2} b_{8,3}$ obtained by concatenating consecutive two symbols at the center of each of the sequence patterns $p_i$ in the ascending order of i, The symbol sequence specifying section may specify each sequence pattern matching one of the partial sequence composed of the two symbols, one symbol immediately preceding the two symbols and the other symbol immediately following the two symbols, and an inverted sequence of symbols obtained by inverting the symbols of the partial sequence, among the sequence patterns $p_i$, for every consecutive two symbols included in the input symbol sequence.

The signal generating section may generate the pattern signal for each sequence pattern specified by the symbol sequence specifying section for every consecutive two symbols included in the input symbol sequence, by inverting the partial signal that is the portion to which the two symbols are assigned of the first signal inputted by the signal inputting section if a corresponding sequence pattern is specified by the symbol sequence specifying section as a sequence pattern matching the inverted sequence and by adding the partial signal.

The signal generating section may add a substantially equal number of partial signals for each sequence pattern.

The signal inputting section may input the first signal to a code conversion table in which the symbol sequence memory section and the symbol sequence specifying section are implemented.

The code conversion table may output the partial signal to be added by the signal generating section for each sequence pattern based on the first signal inputted by the signal inputting section.

The signal generating section may generate the pattern signal for each sequence pattern by adding the partial signal outputted by the code conversion table.

A receiver according to one aspect of the present invention may include:

a signal receiving section configured to receive a modulation signal modulated by a spreading sequence composed of m elements in a set A having n kinds of symbols as elements where $m \geq 4d$, $d \geq 1$, $n \geq 2$, and m, d and n are integers;

a baseband signal acquiring section configured to generate a first signal of a baseband signal as a digital signal sampled from the modulation signal received by the signal receiving section in a predetermined sampling cycle;

a signal inputting section configured to input the first signal generated by the baseband signal acquiring section;

a symbol sequence memory section configured to store a converted sequence of symbols obtained by concatenating consecutive 2d symbols at the center of each of $n^{4d}$ kinds of sequence patterns, each sequence pattern being composed of 4d elements in the set A, the converted sequence of symbols being structured so that d symbol immediately preceding the 2d symbols and d symbol immediately following the 2d symbols are identical to d symbol immediately preceding corresponding 2d symbols and d symbol immediately following the corresponding 2d symbols of a corresponding sequence pattern;

a symbol sequence specifying section configured to specify a sequence pattern matching a partial sequence composed of the 2d symbols, the d symbol immediately preceding the 2d symbols and the d symbol immediately following the 2d symbols, among the sequence patterns for every consecutive 2d symbols included in an input symbol sequence $x_1$ $x_2$ ... $x_m$ obtained by assigning a symbol to the first signal inputted by the signal inputting section in a coding cycle of the spreading sequence;

a signal generating section configured to generate a pattern signal by adding a partial signal that is a portion to which the 2d symbols are assigned of the first signal inputted by the signal inputting section, for each sequence pattern specified by the symbol sequence specifying section for every consecutive 2d symbols included in the input symbol sequence; and a signal converting section configured to generate a second signal by concatenating each pattern signal generated by the signal generating section for each sequence pattern, in an order equivalent to an order of the 2d symbols at the center of each sequence pattern concatenated in the converted sequence of symbols stored in the symbol sequence memory section.

The baseband signal acquiring section may determine a start position of the input symbol sequence by calculating a correlation between the first signal and a symbol sequence sampled from the spreading sequence in the predetermined sampling cycle.

The symbol sequence specifying section may specify each sequence pattern for every consecutive 2d symbols at and immediately following the start position calculated by the baseband signal acquiring section.

The baseband signal acquiring section may set or convert the predetermined sampling cycle so that a sampling frequency is an integral multiple of a code frequency of the spreading sequence.

The receiver may further include a signal estimating section configured to calculate at least one of amplitude, phase, and delay of the second signal generated by the signal converting section as amplitude, phase, and delay, respectively, of the first signal inputted by the signal inputting section.

The signal inputting section may input the first signal containing one or more multipath waves.

The signal estimating section may estimate multipath in the first signal by calculating at least one of the amplitude, phase, and delay of the second signal generated by the signal converting section.

A code converting method according to one aspect of the present invention may include:

inputting by a processor a first signal sampled in a predetermined sampling cycle from a modulation signal modulated by a spreading sequence composed of m elements in a set A having n kinds of symbols as elements where $m \geq 4d$, $d \geq 1$, $n \geq 2$, and m, d and n are integers;

storing by a memory a converted sequence of symbols obtained by concatenating consecutive 2d symbols at the center of each of $n^{4d}$ kinds of sequence patterns, each sequence pattern being composed of 4d elements in the set A, the converted sequence of symbols being structured so that d symbol immediately preceding the 2d symbols and d symbol immediately following the 2d symbols are identical to d symbol immediately preceding corresponding 2d symbols and d symbol immediately following the corresponding 2d symbols of a corresponding sequence pattern;

specifying by the processor a sequence pattern matching a partial sequence composed of the 2d symbols, the d symbol immediately preceding the 2d symbols and the d symbol immediately following the 2d symbols, among the sequence patterns, for every consecutive 2d symbols included in an input symbol sequence $x_1$ $x_2$ ... $x_m$ obtained by assigning a symbol to the first signal in a coding cycle of the spreading sequence;

generating by the processor a pattern signal by adding a partial signal that is a portion to which the 2d symbols are assigned of the first signal, for each sequence pattern specified for every 2d symbols included in the input symbol sequence; and generating by the processor a second signal by concatenating each pattern signal generated for each sequence pattern, in an order equivalent to an order of the 2d symbols at the center of each sequence pattern concatenated in the converted sequence of symbols stored in the memory.

Effect of the Invention

A code converting apparatus according to one aspect of the present invention may estimate the incoming time or direction of a received code modulation signal accurately with less calculation by:

a signal inputting section inputting a first signal sampled in a predetermined sampling cycle from a modulation signal modulated by a spreading sequence composed of m elements in a set A having n kinds of symbols as elements where $m \geq 4d$, $d \geq 1$, $n \geq 2$, and m, d and n are integers;

a symbol sequence memory section storing a converted sequence of symbols obtained by concatenating consecutive 2d symbols at the center of each of $n^{4d}$ kinds of sequence patterns, each sequence pattern being composed of 4d elements in the set A, the converted sequence of symbols being structured so that d symbol immediately preceding the 2d symbols and d symbol immediately following the 2d symbols are identical to d symbol immediately preceding corresponding 2d symbols and d symbol immediately following the corresponding 2d symbols of a corresponding sequence pattern;

a symbol sequence specifying section specifying a sequence pattern matching a partial sequence composed of the 2d symbols, the d symbol immediately preceding the 2d symbols and the d symbol immediately following the 2d symbols, among the sequence patterns, for every consecutive 2d symbols included in an input symbol sequence $x_1 x_2 \ldots x_m$ obtained by assigning a symbol to the first signal inputted by the signal inputting section in a coding cycle of the spreading sequence;

a signal generating section generating a pattern signal for each sequence pattern specified by the symbol sequence specifying section for every consecutive 2d symbols included in the input symbol sequence, by adding a partial signal that is a portion to which the 2d symbols are assigned of the first signal inputted by the signal inputting section; and a signal converting section generating a second signal by concatenating each pattern signal generated by the signal generating section for each sequence pattern, in an order equivalent to an order of the 2d symbols at the center of each sequence pattern concatenated in the converted sequence of symbols stored in the symbol sequence memory section.

BEST MODE FOR CARRYING OUT THE INVENTION

Embodiments of the present invention are described below with reference to the accompanying drawings.

Embodiment 1

FIG. 1 shows a block diagram illustrating a configuration of a code converting apparatus 100 according to a first embodiment. FIG. 2 shows a flowchart illustrating an operation of the code converting apparatus 100 (i.e., a code converting method).

Referring to FIG. 1, the code converting apparatus 100 includes a signal inputting section 101, a symbol sequence memory section 102, a symbol sequence specifying section 103, a signal generating section 104, and a signal converting section 105. Referring to FIG. 2, the code converting apparatus 100 carries out a code conversion process, Step S101 to Step S104, by using the sections shown in FIG. 1.

The code conversion process of this embodiment uses a symbol sequence $x_1 x_2 \ldots x_m$ expressed by a permutation of m elements in a set A having predetermined n kinds of symbols where m, d, and n are integers satisfying $m \geq 4d$, $d \geq 1$, and $n \geq 2$. A symbol sequence composed of consecutive 4d symbols at an arbitrary position in the symbol sequence $x_1 x_2 \ldots x_m$ can be expressed by $n^{4d}$ kinds of sequence patterns $p_i = b_{i,1} b_{i,2} \ldots b_{i,4d} (i=1, 2, \ldots, n^{4d})$. The sequence patterns $p_i$ are permutated and defined so that $$b_{k,2d+1} b_{k,2d+2} \ldots b_{k,4d} = b_{k+1,1} b_{k+1,2} \ldots b_{k+1,2d} \text{ where } k=1, 2, \ldots, n^{4d}-1$$

and $$b_{n^{4d},2d+1} b_{n^{4d},2d+2} \ldots b_{n^{4d},4d} = b_{1,1} b_{1,2} \ldots b_{1,2d}.$$

FIG. 3 shows an example of algorithm for the permutation of the sequence patterns $p_i$. This example shows a pseudo program expressing a process permutating the sequence patterns $p_i$ by using $n^{2d}$ kinds of symbol sequences $q_1 q_2 \ldots q_s$, where $s=n^{2d}$, each of which is composed of 2d symbols. It is noted that "•" in the pseudo program represents concatenation of symbol sequences.

There are sixteen kinds of pre-permutated sequence patterns $p_i$, $q_1 q_1$, $q_1 q_2$, $q_1 q_3$, $q_1 q_4$, $q_2 q_1$, $q_2 q_2$, $q_2 q_3$, $q_2 q_4$, $q_3 q_1$, $q_3 q_2$, $q_3 q_3$, $q_3 q_4$, $q_4 q_1$, $q_4 q_2$, $q_4 q_3$, and $q_4 q_4$ if $s=4$. In this case, the permutation algorithm shown in FIG. 3 sets the following sequence patterns:

(1) $p_1 = q_1 \cdot q_1$;
(2) $p_2 = q_1 \cdot q_2$, $p_3 = q_2 \cdot q_1$;
(3) $p_4 = q_1 \cdot q_3$, $p_5 = q_3 \cdot q_1$;
(4) $p_6 = q_1 \cdot q_4$, which is immediately followed by $p_7 = q_4 \cdot q_2$, and not by $q_4 \cdot q_1$;
(5) $p_8 = q_2 \cdot q_2$;
(6) $p_9 = q_2 \cdot q_3$, $p_{10} = q_3 \cdot q_2$;
(7) $p_{11} = q_2 \cdot q_4$, which is immediately followed by $p_{12} = q_4 \cdot q_3$, and not by $q_4 \cdot q_2$, which is already set as $p_7$;
(8) $p_{13} = q_3 \cdot q_3$;
(9) $p_{14} = q_3 \cdot q_4$, which is immediately followed by $p_{15} = q_4 \cdot q_4$, and not by $q_4 \cdot q_3$, which is already set as $p_{12}$;
(10) $p_{16} = q_4 \cdot q_1$.

It is noted that any permutation algorithm different from that shown in FIG. 3 may be used alternatively if the sequence patterns $p_i$ can be permutated to meet the conditions described above.

The code converting apparatus 100 of this embodiment carries out a code conversion process as follows: A signal modulated by a spreading sequence having a code length of m (hereinafter, referred to as a "received signal") is converted into a signal having a code length of $2dn^{4d}$ (hereinafter, referred to as a "converted signal"). The received signal corresponds to the symbol sequence $x_1 x_2 \ldots x_m$, and the converted signal corresponds to a symbol sequence, $$c_1 c_2 \ldots c_{2dn^{4d}} = b_{1,d+1} b_{1,d+2} \ldots b_{1,3d} b_{2,d+1} \ldots b_{2,3d} \ldots b_{n^{4d},d+1} \ldots b_{n^{4d},3d}$$

which is obtained by concatenating consecutive 2d symbols at the center of each of the sequence patterns $p_i$ permutated and defined as described above. It is noted that the received signal is already converted into a baseband signal, and a code start position is more or less known (i.e., estimated), at the start of the code conversion process. The code converting apparatus 100 treats the code start position as a code conversion start position, which will be elaborated later. The code converting apparatus 100 carries out the code conversion process for each received signal modulated by a partial spreading sequence having a length of 2d as a unit. It is noted that partial spreading sequences each having a code length of d on both sides of the partial spreading sequence having the length of 2d are also processed by the code converting apparatus 100. Specifically, the code converting apparatus 100 searches for a sequence pattern that matches a partial spreading sequence having a length of 4d, and adds the received signal modulated by the partial spreading sequence having the length of 2d at the center to the converted signal at the position of $c_{2d(i-1)+1} c_{2d(i-1)+2} \ldots c_{2d(i-1)+2d}$. This operation is repeated by the code converting apparatus 100 with a shift by a length of the received signal modulated by a partial spreading sequence having a length of 2d. The code converting apparatus 100 may divide the converted signal by the number of addition at the end of the operation.

An operation of the code converting apparatus 100 is described below.

Referring to FIG. 2, the signal inputting section 101 inputs a first signal (i.e., the received signal) obtained by sampling the modulation signal modulated by a predetermined spreading sequence in a predetermined sampling cycle (Step S101). The predetermined spreading sequence is, as noted earlier, a spreading sequence of m elements in a set A having n kinds of symbols as elements. It is noted that a predetermined converted sequence of symbols is stored in the symbol sequence memory section 102. The predetermined converted sequence of symbols is a converted sequence of symbols obtained by concatenating consecutive 2d symbols at the center of each of sequence patterns $p_i$. Each sequence pattern is composed of 4d elements in the set A. The converted sequence of symbols is structured so that d symbol immediately preceding the 2d symbols and d symbol immediately following the 2d symbols are identical to d symbol immediately preceding corresponding 2d symbols and d symbol immediately following the corresponding 2d symbols of a corresponding sequence pattern. The $n^{4d}$ kinds of sequence patterns $p_i = b_{i,1} b_{i,2} \ldots b_{i,4d}$, are set as noted earlier so that $$b_{k,2d+1} b_{k,2d+2} \ldots b_{k,4d} = b_{k+1,1} b_{k+1,2} \ldots b_{k+1,2d}$$

and $$b_{n^{4d},2d+1} b_{n^{4d},2d+2} \ldots b_{n^{4d},4d} = b_{1,1} b_{1,2} \ldots b_{1,2d}.$$

Thus, the converted sequence of symbols is, as described above, concatenation of the consecutive 2d symbols at the center of each of the sequence patterns $p_i$ in an ascending order, i.e., $$c_1 c_2 \ldots c_{2dn^{4d}} = b_{1,d+1} b_{1,d+2} \ldots b_{1,3d} b_{2,d+1} \ldots b_{2,3d} \ldots b_{n^{4d},d+1} \ldots b_{n^{4d},3d}.$$

The symbol sequence specifying section 103 specifies a sequence pattern that matches a partial sequence composed of the 2d symbols, the d symbol immediately preceding the 2d symbols and d symbol immediately following the 2d symbols, among the sequence patterns $p_i$ for every consecutive 2d symbols included in an input symbol sequence $x_1 x_2 \ldots x_m$ (Step S102). The input symbol sequence is obtained by assigning a symbol to the received signal inputted by the signal inputting section 101 in a coding cycle of the predetermined spreading sequence. That is, the input symbol sequence is obtained by symbolizing the received signal in a coding cycle of the predetermined spreading sequence. If the code conversion start position is the first symbol in the input symbol sequence, for example, the symbol sequence specifying section 103 firstly specifies a sequence pattern for the 2d symbols $x_{d+1} x_{d+2} x_{3d}$ positioned from the (d+1)-th to the 3d-th in the input symbol sequence. More specifically, the symbol sequence specifying section 103 specifies a sequence pattern that matches the partial sequence $x_1 x_2 \ldots x_{4d}$ composed of the 2d symbols $x_{d+1} x_{d+2} \ldots x_{3d}$, the d symbol $x_1 x_2 \ldots x_d$ immediately preceding the 2d symbols and the d symbol $x_{3d+1} x_{3d+2} \ldots x_{4d}$ immediately following the 2d symbols, among the sequence patterns $p_i$. Thereafter, the symbol sequence specifying section 103 specifies sequence patterns for every consecutive 2d symbols in the order of the 2d symbols positioned from the (3d+1)-th to the 5d-th in the input symbol sequence, the 2d symbols positioned from the (5d+1)-th to the 7d-th in the input symbol sequence, and so on. It is noted that the code conversion start position may not necessarily be the first symbol in the input symbol sequence. Specifically, the code conversion start position may be any of the first to the d-th symbols in the input symbol sequence, or alternatively any of the (m−d+1)-th to the m-th symbols in an input symbol sequence $y_1 y_2 \ldots y_m$ corresponding to the previous received signal (hereinafter, referred to as a "previous input symbol sequence"). If the code conversion start position is the (m−d+1)-th symbol in the previous input symbol sequence, for example, the symbol sequence specifying section 103 firstly specifies a sequence pattern for the 2d symbols $x_1 x_2 \ldots x_{2d}$ positioned from the first to the 2d-th in the input symbol sequence. More specifically, the symbol sequence specifying section 103 specifies a sequence pattern that matches the partial sequence $y_{m-d+1} y_{m-d+2} \ldots y_m x_1 x_2 \ldots x_{3d}$ composed of the 2d symbols $x_1 x_2 \ldots x_{2d}$, the d symbol $y_{m-d+1} y_{m-d+2} \ldots y_m$ immediately preceding the 2d symbols, and the d symbol $x_{2d+1} x_{2d+2} \ldots x_{3d}$ immediately following the 2d symbols, among the sequence patterns $p_i$. Thereafter, the symbol sequence specifying section 103 specifies pattern symbol sequences for every consecutive 2d symbols in the order of the 2d symbols positioned from the (2d+1)-th to the 4d-th in the input symbol sequence, the 2d symbol positioned from the (4d+1)-th to the 6d-th in the input symbol sequence, and so on.

The signal generating section 104 generates a pattern signal by adding a partial signal for each sequence pattern specified by the symbol sequence specifying section 103 for every consecutive 2d symbols included in the input symbol sequence (Step S103). The partial signal is a portion to which the 2d symbols are assigned (i.e., a portion encoded by the 2d symbols) of the received signal inputted by the signal inputting section 101. If the code conversion start position is the first symbol in the input symbol sequence, for example, the signal generating section 104 firstly adds a partial signal for the sequence pattern specified by the symbol sequence specifying section 103 for the 2d symbols $x_{d+1} x_{d+2} \ldots x_{3d}$ positioned from the (d+1)-th to the 3d-th in the input symbol sequence. As this is the initial addition, the signal generating section 104 simply stores the partial signal corresponding to the 2d symbols $x_{d+1} x_{a+2} \ldots x_{3d}$ in a RAM 217 as a pattern signal corresponding to the sequence pattern. Subsequently, the signal generating section 104 adds a partial signal for the sequence pattern specified by the symbol sequence specifying section 103 for the 2d symbols $x_{3d+1} x_{3d+2} \ldots x_{5d}$ positioned from the (3d+1)-th to the 5d-th in the input symbol sequence. If then the pattern signal corresponding to that specific sequence pattern is already stored in the RAM 217, the signal generating section 104 reads that pattern signal from the RAM 217, adds the partial signal corresponding to the 2d symbols $x_{3d+1} x_{3d+2} \ldots x_{5d}$ to the pattern signal, and stores the pattern signal in the RAM 217. If, on the other hand, no pattern signal corresponding to that specific sequence pattern is stored yet in the RAM 217, which indicates an initial addition, then the signal generating section 104 simply stores the partial signal corresponding to the 2d symbols $x_{3d+1} x_{3d+2} \ldots x_{5d}$ in the RAM 217 as the pattern signal corresponding to the sequence pattern. Thereafter, the signal generating section 104 adds a partial signal for each sequence pattern specified by the symbol sequence specifying section 103 for every consecutive 2d symbols in the order of the 2d symbols positioned from the (5d+1)-th to the 7d-th in the input symbol sequence, the 2d symbols positioned from the (7d+1)-th to the 9d-th in the input symbol sequence, and so on. The pattern signals corresponding to the respective sequence patterns are thus stored in the RAM 217 at the end of the operation.

The signal converting section 105 generates a second signal (i.e., the converted signal) by concatenating the pattern signals, each of which is generated for each sequence pattern by the signal generating section 104, in an order equivalent to the order of the 2d symbols at the center of each sequence pattern concatenated in the converted sequence of symbols stored in the symbol sequence memory section 102 (Step S104). Specifically, the signal converting section 105 reads the pattern signals corresponding to the respective sequence patterns from the RAM 217, concatenates the pattern signals in an order corresponding to that of the converted sequence of symbols, and stores the concatenated pattern signals in the RAM 217 as the converted signal. It is noted that Step S103 and Step S104 may be carried out at the same time. More specifically, each pattern signal may be stored as being concatenated in the order corresponding to that of the converted sequence of symbols in the RAM 217 when the addition of partial signals for a sequence pattern is completed in Step S103.

As described above, the code converting apparatus 100 is configured to guarantee, when adding the received signals that have the equivalent partial spreading sequences for each received signal modulated by the partial spreading sequence having the length of 2d, that the partial spreading sequence having the length of d on each side of the partial spreading sequence having the length of 2d is identical between the received signals. Thus, the code converting apparatus 100 can convert a received code modulation signal (i.e., the received signal) into a signal having a small number of samples (i.e., the converted signal) without a change in the relative signal strength, code delay and carrier wave phase of a plurality of signals having relative code delay within ±d symbol from the code conversion start position as a reference point, while maintaining property of periodic continuous function. This enables an accurate estimation of the incoming time or direction of a received code modulation signal, for example, with a small amount of calculation.

Thus, the code converting apparatus 100 of this embodiment may also be characterized as follows.

The code converting apparatus 100 may be used in a system receiving a signal modulated by a spreading sequence corresponding to a symbol sequence $x_1 x_2 \ldots x_m$, composed of m elements in a set A having predetermined n kinds of symbols.

A symbol sequence composed of consecutive 4d symbols at an arbitrary position in the symbol sequence $x_1 x_2 \ldots x_n$, may be expressed with $n^{4d}$ kinds of pattern symbol sequences $p_i = b_{i,1} b_{i,2} \ldots b_{i,4d}$.

The pattern symbol sequences $p_i$ may be defined so that $$b_{k,2d+1} b_{k,2d+2} \ldots b_{k,4d} = b_{k+1,1} b_{k+1,2} \ldots b_{k+1,2d}$$

and $$b_{n^{4d},2d+1} b_{n^{4d},2d+2} \ldots b_{n^{4d},4d} = b_{1,1} b_{1,2} \ldots b_{1,2d}.$$

A received signal modulated by a spreading sequence having the code length of m may be converted into a signal having the code length of $2dn^{4d}$ by using a symbol sequence obtained by concatenating 2d symbols at the center of each of the sequence patterns $p_i$, $$c_1 c_2 \ldots c_{2dn^{4d}} = b_{1,d+1} b_{1,d+2} \ldots b_{1,3d} b_{2,d+1} \ldots b_{2,3d} \ldots b_{n^{4d},d+1} \ldots b_{n^{4d},3d}$$

and the symbol sequence $x_1 x_2 \ldots x_m$ and the set $\{p_i\}$ of the sequence patterns.

This may enable a received signal to be converted into a signal having a small number of samples without a change in the relative signal strength, code delay and carrier wave phase of each of incoming signals having a relative code delay within ±d symbol, while each of incoming signals maintains a property of periodic continuous function.

Embodiment 2

In a second embodiment, the code converting method of the first embodiment is applied to a method for estimating multipath in a received signal (hereinafter, referred to also as an "incoming signal" or an "incoming wave"). It is noted that the code converting method of the first embodiment may also be applied to a method for estimating incoming time or direction for a plurality of signals received by an array antenna or the like in the same manner as the second embodiment.

An example of application of this embodiment to a positioning apparatus using the GPS (Global Positioning System) is described below. It is noted that this embodiment is also applicable to an apparatus using a different communicating method or a different positioning method.

FIG. 4 shows a block diagram illustrating a configuration of a receiver 200 (i.e., a positioning apparatus using the GPS) according to this embodiment. FIG. 5 shows a block diagram illustrating an example of a hardware configuration of the receiver 200. FIG. 6 shows a flowchart illustrating an operation of the receiver 200 (i.e., a method of high accuracy positioning based on multipath estimation).

Referring to FIG. 4, the receiver 200 includes a signal receiving section 201, a frequency converting section 202, an A/D (analog/digital) converting section 203, a signal processing section 204, a signal memory section 205, a signal estimating section 206, a propagation delay time calculating section 207, and a position calculating section 208, in addition to the code converting apparatus 100, which is identical to that of the first embodiment. The frequency converting section 202, the A/D converting section 203, and the signal processing section 204 constitute a baseband signal acquiring section 209.

Referring to FIG. 5, an antenna 211, a RF (Radio Frequency) module 212, an A/D converter circuit 213, and a signal processing circuit 214 are implementation examples of the signal receiving section 201, the frequency converting section 202, the A/D converting section 203, and the signal processing section 204, respectively. A CPU (Central Processing Unit) 215 is an example of a processor. The CPU 215 is connected to a ROM (Read Only Memory) 216 and the RAM (Random Access Memory) 217 via a bus 218, and controls those hardware devices. The ROM 216 is an example of a nonvolatile memory. The RAM 217 is an example of a volatile memory. These are examples of memories. The ROM 216 may be replaced by a different nonvolatile memory such as a flash memory. A program group is stored in the ROM 216 in advance. The program group includes programs for executing the functions of the sections of the code converting apparatus 100, the signal estimating section 206, the propagation delay time calculating section 207, and the position calculating section 208. Programs are read and executed by the CPU 215. A data group is stored in the RAM 217. The data group includes data, information, signals, variables, and parameters to be inputted, used, converted, extracted, searched for, referred to, compared, controlled, generated, calculated, or outputted by the sections of the code converting apparatus 100, the signal estimating section 206, the propagation delay time calculating section 207, and the position calculating section 208. Some data, information, signals, variables, and parameters may be stored in the ROM 216 in advance, and read by the CPU 215 via a read/write circuit to the RAM 217 to be used for various processes (e.g., inputting, using, conversion, extraction, search, reference, comparison, control, generation, calculation, and outputting processes) by the CPU 215.

Any element described as a "section" in the description of this embodiment may be replaced by a "circuit", a "device", or "equipment", or otherwise a "step", a "procedure", or a "process". More specifically, an element described as a "section" may be implemented by firmware stored in the ROM 216, for example. Alternatively, an element described as a "section" may be implemented exclusively by software; or exclusively by hardware such as an elemental device, a device, a substrate, or wiring; or by a combination of software and hardware; or by a combination of software, hardware and firmware. Firmware and software may be stored as a program in a storage medium, such as the ROM 216. This program is read and executed by the CPU 215. Specifically, the program causes a computer to function as a "section" described in the description of this embodiment, or causes a computer to execute the procedure or method of a "section" described in the description of this embodiment.

Each section of the code converting apparatus 100 may be implemented as a program stored in the ROM 216 and executed by the CPU 215, as mentioned above. Alternatively, each section of the code converting apparatus 100 may be implemented in the signal processing circuit 214.

An operation of the receiver 200 is described below.

Referring to FIG. 6, the antenna 211 (i.e., the signal receiving section 201) receives a GPS signal transmitted from a plurality of GPS satellites (Step S201). The baseband signal acquiring section 209 generates the first signal (i.e., the baseband signal) as a digital signal sampled from the GPS signal received by the antenna 211 in the predetermined sampling cycle (Step S202 to Step S204). More specifically, the RF module 212 (i.e., the frequency converting section 202) generates an intermediate signal by converting a center frequency of the GPS signal received by the antenna 211 into a predetermined intermediate frequency (Step S202). The A/D converter circuit 213 (i.e., the A/D converting section 203) generates a digital signal by sampling the intermediate signal generated by the RF module 212 in the predetermined sampling cycle (Step S203). The signal processing circuit 214 (i.e., the signal processing section 204) generates the baseband signal by removing the predetermined intermediate frequency from the digital signal generated by the A/D converter circuit 213. The signal processing circuit 214 then demodulates the baseband signal to obtain navigation data. The signal processing circuit 214 then stores the baseband signal and the navigation data in the RAM 217 (i.e., the signal memory section 205) (Step S204). It is noted that the baseband signal acquiring section 209, instead of being configured to include the RF module 212, the A/D converter circuit 213 and the signal processing circuit 214, may alternatively be configured to generate the baseband signal without using the intermediate frequency based on, for example, a direct conversion method.

The code converting apparatus 100 converts the baseband signal stored in the RAM 217 in Step S204 into the second signal (i.e., the converted signal) by executing the code conversion process described earlier, and stores the second signal in the RAM 217 (Step S101 to Step S104).

The signal estimating section 206, the propagation delay time calculating section 207, and the position calculating section 208 are stored in the ROM 216 as programs in advance, and read and executed by the CPU 215. The signal estimating section 206 estimates the amount of code delay of a direct wave and, if any, one or more multipath waves included in the converted signal stored in the RAM 217 by the code converting apparatus 100 (specifically the signal converting section 105) (Step S205). The propagation delay time calculating section 207 calculates the propagation delay time of the direct wave by using the amount of code delay of the direct wave estimated by the signal estimating section 206 and the navigation data stored in the RAM 217 in Step S204 (Step S206). The position calculating section 208 calculates the position of the receiver 200 by using the propagation delay time of the direct wave from the plurality of GPS satellites calculated by the propagation delay time calculating section 207 and the navigation data stored in the RAM 217 in Step S204 (Step S207).

If conventional art is applied in Step S205, then the signal estimating section 206 has to estimate the amount of code delay of each incoming signal based on the baseband signal stored in the RAM 217 in Step S204. This results in an increase in the amount of calculation, compared to the above mentioned case based on the converted signal stored in the RAM 217 by the code converting apparatus 100.

A detailed description of the method for estimating multipath in a received signal is now given before an elaboration of the code conversion process of this embodiment, which will be given later.

The signal estimating section 206 can be used as a means for solving a maximum likelihood problem explained below. It is noted that symbols used below are different from those used in the explanation of the first embodiment.

The following equation (1) shows a baseband signal model sampled in a sampling interval T:

$$\hat{r}(j) = \sum_{p=1}^{P} \alpha_p e^{i\theta_p} m(jT - \tau_p) \tag{1}$$

where P denotes the number of incoming signals; $\alpha_p$, $\theta_p$, and $\tau_p$ denote the amplitude, initial phase, the amount of code delay of the p-th incoming signal, respectively; i denotes a unit of imaginary number; j denotes a sample number; and m(t) denotes a C-A (Coarse-Acquisition) code (i.e., the spreading sequence) which is band-limited according to a signal bandwidth. The followings are defined:

$$\vec{\alpha} = (\alpha_1, \ldots, \alpha_p)^t, \vec{\theta} = (\theta_1, \ldots, \theta_p)^t, \vec{\tau} = (\tau_1, \ldots, \tau_p)^t$$

In practice, the following equation (2) equivalent to the equation (1) can be used for easier calculation:

$$\hat{r}(j) = \sum_{p=1}^{P} (a_p + ib_p) m(jT - \tau_p) \tag{2}$$

Thereafter, $\vec{a} = (a_1, \ldots, a_p)^t$, $\vec{b} = (b_1, \ldots, b_p)^t$ are defined.

The following equation (3) is discrete Fourier transform of the equation (2):

$$\hat{R}(\omega) = \sum_{p=1}^{P} (a_p + ib_p) M(\omega) e^{-i\omega\tau_p}$$

where M(ω) is discrete Fourier transform of m(jT).

Let r(j) and R(ω) denote the received baseband signal and the discrete Fourier transform of r(j), respectively. It is assumed that r(j)=r̂(j)+n(j) where n(j) denotes white noise in a complex number. In the maximum likelihood estimation for time domain signals, $\vec{a}$, $\vec{b}$, $\vec{\tau}$ to minimize the following equation (4) are calculated.

$$J = \sum_j |r(j) - \hat{r}(j)|^2 \quad (4)$$

However, it takes a large amount of calculation to calculate $m(jT-\tau_p)$ if the amount of code delay $\tau_p$ is a value other than kT, where k is an integer, (i.e., a value that is not an integral multiple of T) in the equation (4). On the other hand, calculation errors may occur when the equation (4) is minimized, if the amount of code delay $\tau_p$ is kT. Further, in this case, the amount of calculation may explode as the number of incoming signals P increases, in a search for combinations of $\tau_p$, of incoming signals. Even if a nonlinear minimization method is used with introducing a process rounding the amount of code delay $\tau_p$ to kT, it is possible that calculation becomes unstable.

Given this fact, a maximum likelihood estimation may be performed within the frequency domain as a possible solution to the above problem. Specifically, a method for minimizing the following equation (5) may be used.

$$J' = \sum_\omega |R(\omega) - \hat{R}(\omega)|^2 \quad (5)$$

The signal estimating section 206 can estimate not only the amount of code delay of each incoming signal but also the amplitude and phase of each incoming signal by solving the minimization problem of the equation (4) or the equation (5). In practice, the signal estimating section 206 replaces the baseband signal sampled from the GPS signal with the converted signal, and also replaces the band-limited C-A code with the code-converted C-A code. Then, the signal estimating section 206 determines the delay, amplitude and phase of each of the incoming waves included in the converted signal by solving the minimization problem of the equation (4) or the equation (5). The signal estimating section 206 can estimate multipath based on the delay, amplitude, and phase of each of the incoming waves included in the converted signal, which are determined as substitutes for the delay, amplitude, and phase of each of the original incoming signals.

The code conversion process of this embodiment is now elaborated as a method for reducing the amount of calculation for the minimization problem of the equation (4) or the equation (5). It is noted that symbols used below are common to those used in the description of the first embodiment.

A GPS signal is a BPSK (Binary Phase Shift Keying) signal where the symbol set $A=\{-1, 1\}$ (i.e., n=2). The C-A code of the spreading sequence is expressed by a symbol sequence $x_1\ x_2\ \ldots\ x_{1023}$ having the length of 1023 where m=1023. In the GPS signal, a multipath wave having a relative code delay of at least one symbol to a direct wave has little influence on the code delay estimation of the direct wave. Thus, the code conversion process of this embodiment capable of converting each of incoming signals having relative code delay within ±1 symbol into a signal having a small number of samples without a change in the relative signal strength (i.e., amplitude), code delay, and carrier wave phase of each of the incoming signals, while maintaining property of periodic continuous function, is effective.

A symbol sequence composed of consecutive 4 symbols (i.e., d=1) at an arbitrary position of a symbol sequence $x_1\ x_2\ \ldots\ x_{1023}$ is expressed by $2^{4-1}(=8)$ kinds of sequence patterns $p_i = b_{i,1}\ b_{i,2}\ b_{i,3}\ b_{i,4}$ where $b_{i,1}=1$ and $i=1, 2, \ldots, 8$ shown in the following equation set (6), and their inverted sequence patterns.

$$
\begin{aligned}
p_1 &= \phantom{-}1 \phantom{-}\ \phantom{-}1 \phantom{-}\ \phantom{-}1 \phantom{-}\ \phantom{-}1 \\
p_2 &= \phantom{-}1 \phantom{-}\ \phantom{-}1 \phantom{-}\ \phantom{-}1 \phantom{-}\ -1 \\
p_3 &= \phantom{-}1 \phantom{-}\ \phantom{-}1 \phantom{-}\ -1 \phantom{-}\ \phantom{-}1 \\
p_4 &= \phantom{-}1 \phantom{-}\ \phantom{-}1 \phantom{-}\ -1 \phantom{-}\ -1 \\
p_5 &= \phantom{-}1 \phantom{-}\ -1 \phantom{-}\ \phantom{-}1 \phantom{-}\ \phantom{-}1 \\
p_6 &= \phantom{-}1 \phantom{-}\ -1 \phantom{-}\ \phantom{-}1 \phantom{-}\ -1 \\
p_7 &= \phantom{-}1 \phantom{-}\ -1 \phantom{-}\ -1 \phantom{-}\ \phantom{-}1 \\
p_8 &= \phantom{-}1 \phantom{-}\ -1 \phantom{-}\ -1 \phantom{-}\ -1
\end{aligned} \quad (6)
$$

The sequence patterns $p_i$ may be defined as the following equation set (7) by permutation so that $b_{k,3}\ b_{k,4}=b_{k+1,1}\ b_{k+1,2}$ where $k=1, 2, \ldots, 7$ and $b_{8,3}\ b_{8,4}=b_{1,1}\ b_{1,2}$, while allowing inversion.

$$
\begin{aligned}
p_1 &= \phantom{-}1 \phantom{-}\ \phantom{-}1 \phantom{-}\ \phantom{-}1 \phantom{-}\ \phantom{-}1 \\
p_2 &= \phantom{-}1 \phantom{-}\ \phantom{-}1 \phantom{-}\ \phantom{-}1 \phantom{-}\ -1 \\
p_3 &= \phantom{-}1 \phantom{-}\ -1 \phantom{-}\ \phantom{-}1 \phantom{-}\ \phantom{-}1 \\
p_4 &= \phantom{-}1 \phantom{-}\ \phantom{-}1 \phantom{-}\ -1 \phantom{-}\ \phantom{-}1 \\
p_5 &= -1 \phantom{-}\ \phantom{-}1 \phantom{-}\ -1 \phantom{-}\ \phantom{-}1 \\
p_6 &= -1 \phantom{-}\ \phantom{-}1 \phantom{-}\ \phantom{-}1 \phantom{-}\ -1 \\
p_7 &= \phantom{-}1 \phantom{-}\ -1 \phantom{-}\ -1 \phantom{-}\ -1 \\
p_8 &= -1 \phantom{-}\ -1 \phantom{-}\ \phantom{-}1 \phantom{-}\ \phantom{-}1
\end{aligned} \quad (7)
$$

It is noted that a sequence pattern set different from the equation set (7) may alternatively be used if the sequence patterns $p_i$ can be permutated so that $b_{k,3}\ b_{k,4}=b_{k+1,1}\ b_{k+1,2}$ and $b_{8,3}\ b_{8,4}=b_{1,1}\ b_{1,2}$.

The following equation (8) shows a sequence pattern $c_1\ c_2 \ldots c_{16}=b_{1,2}\ b_{1,3}\ b_{2,2}\ b_{2,3} \ldots b_{8,2}\ b_{8,3}$ obtained by concatenating the consecutive two symbols at the center of each of the sequence patterns $p_i$ of the equation set (7).

$$c_1\ c_2 \ldots c_{16} = 1\ 1\ 1\ 1\ -1\ 1\ 1\ -1\ 1\ -1\ 1\ -1\ -1\ -1\ 1\ 1 \quad (8)$$

The code converting apparatus 100 of this embodiment carries out, as the code conversion process, a process to convert the received signal modulated by the C-A code having the code length of 1023 corresponding to the symbol sequence $x_1\ x_2 \ldots x_{1023}$ into the signal having the code length of 16 (i.e., the converted signal) corresponding to the symbol sequence $c_1\ c_2 \ldots c_{16}$ obtained by concatenating the consecutive two symbols at the center of each of the sequence patterns $p_i$ permutated and defined as described above. It is noted that the received signal is already converted to the baseband signal, and the code start position is more or less known (i.e., estimated) based on a correlation operation between the baseband signal and the C-A code, at the start time of the code conversion process. The code converting apparatus 100 treats the code start position as the code conversion start position. More specifically, the code start position of the received signal calculated by a correlator equipped in an ordinary GPS receiver can be used as the code conversion start position. The code converting apparatus 100 carries out the code conversion process for each received signal modulated by the partial spreading sequence having the length of two. It is noted that the partial spreading sequence having the length of one on each side of the partial spreading sequence having the length of two are also processed by the code converting apparatus 100. More specifically, the code converting apparatus 100 searches for a sequence pattern matching the partial spreading sequence having the length of four, and adds the received signal modulated by the partial spreading sequence having the length of two at the center to the converted signal at the position of $c_{2(i-1)+1} c_{2(i-1)+2}$. If the partial spreading sequence having the length of four matches an inverted $p_i$ as a search result for a sequence pattern matching a partial spreading sequence having the length of four, the code converting apparatus 100 inverts the received signal modulated by the partial spreading sequence having the length of two at the center, and then adds the inverted received signal to the converted signal at the position of $c_{2(i-1)+1} c_{2(i-1)+2}$. The code converting apparatus 100 then repeats this operation with a shift by the length of the received signal modulated by the partial spreading sequence having the length of two. The code converting apparatus 100 may alternatively divide the converted signal by the number of additions at the end of the operation.

The code conversion process of this embodiment is now elaborated with reference to FIG. 2. It is noted that the start position (i.e., the code start position) of the input symbol sequence $x_1 x_2 \ldots x_{1023}$ is calculated before the code conversion process is executed, by the signal processing circuit 214 calculating a correlation between the baseband signal and the over-sampled C-A code in the predetermined sampling cycle, namely a sampling cycle same as that of the baseband signal, in S204.

Referring to FIG. 2, the signal inputting section 101 reads the first signal (i.e., the baseband signal) obtained by sampling the GPS signal modulated by the C-A symbol composed of 1023 elements in the set $A=\{-1, 1\}$ in the predetermined sampling cycle from the RAM 217 and inputs the first signal (Step S101). It is noted that the symbol sequence memory section 102 sets the sequence patterns $p_i = b_{i,1} b_{i,2} b_{i,3} b_{i,4}$ so that $b_{k,3} b_{k,4} = b_{k,1} b_{k,2}$ and $b_{8,3} b_{8,4} = b_{1,1} b_{1,2}$, and stores the converted sequence of symbols $c_1 c_2 \ldots c_{16} = b_{1,2} b_{1,3} b_{2,2} b_{2,3} \ldots b_{8,2} b_{8,3}$ obtained by concatenating the consecutive two symbols at the center of each of the sequence patterns $p_i$ in an ascending order of i, in advance.

The symbol sequence specifying section 103 specifies the sequence pattern matching the partial sequence composed of the two symbols, the symbol immediately preceding the two symbols and the symbol immediately following the two symbols, or the inverted sequence obtained by inverting the symbols of the partial sequence, among the sequence patterns $p_i$, for every two symbols after the code start position determined by the signal processing circuit 214 (Step S102).

The signal generating section 104 generates the pattern signal by adding each partial signal that is a portion to which the two symbols are assigned of the baseband signal inputted by the signal inputting section 101, for each sequence pattern specified by the symbol sequence specifying section 103 for every consecutive two symbols included in the input symbol sequence (Step S103). It is noted that if the sequence pattern is specified by the symbol specifying section 103 as a sequence pattern matching an inverted sequence, then the signal generating section 104 inverts the partial signal, and then adds the inverted partial signal to generate the pattern signal.

The signal converting section 105 generates the second signal (i.e., the converted signal) by concatenating the pattern signals generated by the signal generating section 104 for each sequence pattern, in the same order as that of the two symbols at the center of each sequence pattern concatenated in the converted sequence of symbols stored in the symbol sequence memory section 102, and stores the converted signal in the RAM 217 (Step S104).

After the code conversion process is executed, the signal estimating section 206, in Step S205, calculates the amplitude, phase, and delay, or any of these required, of the converted signal (i.e., the second signal generated by the signal converting section 105) stored in the RAM 217 in Step S104 as the amplitude, phase, and delay, or any of these required, of the baseband signal (i.e., the first signal inputted by the signal inputting section 101) stored in the RAM 217 in Step S204. The signal estimating section 206 can determine the delay of a direct wave accurately even if the baseband signal includes one or more multipath components, by calculating the amplitude, phase, and delay, or any of these required, of each incoming wave based on the converted signal.

The code converting apparatus 100 thus replaces the original baseband signal with the converted baseband signal, and also replaces the original C-A code with the converted C-A code. This results in a reduction in the length of a signal to be processed by up to approximately 1.6%. Hence, the amount of calculation to solve the minimization problem of the equation (4) or the equation (5) can be greatly reduced.

FIG. 7 shows an example process of conversion by the code converting apparatus 100 from the baseband signal to the converted signal (i.e., an example of a code conversion result). This example shows that the code converting apparatus 100 performs a code conversion process for a baseband signal including a first incoming wave and a second incoming wave having half symbol delay to the first incoming wave. It is noted that the code conversion start position is the code start position of the first incoming wave, for convenience of explanation. FIG. 7 illustrates that, in the code-converted baseband signal (i.e., the converted signal), the relative signal strength and relative code delay of the first and second incoming waves are unchanged, the property of periodic continuous function of both the first and second incoming waves are maintained, and the baseband signal itself is converted into a signal having a small number of samples. It is noted that the first incoming wave and the second incoming wave have the same carrier wave phase, for convenience of explanation. If the carrier wave phase is different between the first incoming wave and the second incoming wave, however, the relative carrier wave phase does not change before and after the execution of the code conversion process.

Thus, the code converting apparatus 100 of this embodiment may also be characterized as follows.

In the case of the binary phase shift keying whose symbol set is $A=\{-1, 1\}$ the symbol sequence composed of consecutive 4 symbols in the symbol sequence $x_1 x_2 \ldots x_m$ at an arbitrary position is expressed by $2^{4-1}$ kinds of sequence patterns $p_i = b_{i,1} b_{i,2} b_{i,3} b_{i,4}$ ($b_{i,1}=1$) and their inverted sequence patterns.

The sequence patterns $p_i$ may be permutated so that $b_{k,3} b_{k,4} = b_{k+1,1} b_{k+1,2}$ and $b_{8,3} b_{8,4} = b_{1,1} b_{1,2}$ while inversion is allowed.

The received signal modulated by a spreading sequence having the code length of m is converted into the signal having the code length of 16 by using the symbol sequence $c_1 c_2 \ldots c_{16} = b_{1,2} b_{1,3} b_{2,2} b_{2,3} \ldots b_{8,2} b_{8,3}$ obtained by concatenating the 2 symbols at the center of each of the sequence patterns $p_i$, the symbol sequence $x_1 x_2 \ldots x_m$, and the set $\{p_i\}$ of the sequence patterns.

This may allow the received signal to be converted into a signal having the number of samples further reduced to half the number of samples of the case of the first embodiment without a change in the relative signal strength, code delay, and carrier wave phase of each of the incoming signals having a relative code delay within ±1 symbol, while each of the incoming signals is allowed to maintain a property of periodic continuous function, when the received signal is the binary phase shift keying signal and a relative code delay is within ±1 symbol, which makes it difficult to analyze a code delay.

The code converting apparatus 100 of this embodiment may also be characterized in that the code start position of the received signal is calculated through a correlation operation, and the code start position is used as the code conversion start position.

This makes it easy to determine the code conversion start position based on the received code modulation signal.

For an accurate code conversion process in this embodiment, it is desirable that the sampling frequency of the received signal is an integral multiple of a chip rate of spreading sequence. In this case, the baseband signal acquiring section 209 sets or converts the above-mentioned predetermined sampling cycle so that the sampling frequency (i.e., the inverse of the predetermined sampling cycle) is the integral multiple of the code frequency of the C-A code (i.e., the spreading sequence). Specifically, the A/D converter circuit 213 (i.e., the A/D converting section 203) sets the sampling frequency to the integral multiple of the code frequency of the C-A code, for example. The A/D converter circuit 213 then generates the digital signal by sampling the intermediate signal generated by the RF module 212 in the set sampling frequency in Step S203 in FIG. 6. Alternatively, the signal processing circuit 214 (i.e., the signal processing section 204) may convert the sampling frequency into the integral multiple of the code frequency of the C-A code. In this case, the signal processing circuit 214 generates the first signal of the baseband signal by converting the sampling frequency of the digital signal generated by the A/D converter circuit 213 into the integral multiple of the code frequency of the C-A code and sampling the signal, and then removing the intermediate frequency from the digital signal, in Step S204 in FIG. 6.

Embodiment 3

The number of appearances of each sequence pattern included in the sequence patterns $p_i$ differs. Therefore, by using each sequence pattern an equal number of times, the noise of the code converted signal can be equalized. Thus, in a third embodiment, the signal generating section 104 is designed to add an equal number of partial signals for each sequence pattern in Step S103 in FIG. 2. Specifically, the signal generating section 104 limits the number of times it adds partial signals for each sequence pattern specified by the symbol sequence specifying section 103, to a constant number. The constant number here may be a preset threshold common to all the sequence patterns. Alternatively, the constant number may be the number of times of addition of the partial signal of the sequence pattern having a least number of times of all the sequence patterns.

Thus, the code converting apparatus 100 of this embodiment may be characterized in that the number of each sequence pattern to be used is equalized.

This may allow the noise in the code converted signal to be equalized.

Embodiment 4

The code conversion process is performed for each baseband signal modulated by the partial spreading sequence having the length of 2d symbols. Therefore, the code conversion start position may be shifted by the length of 1 to 2d−1 symbols, as mentioned earlier. A fourth embodiment introduces code conversion start position data that indicates, as the code conversion start position, a position that makes the numbers of partial signals to be added for each sequence pattern by the signal generating section 104 as uniform as possible. The code conversion start position data is stored in a memory (e.g., the ROM 216 in the second embodiment) in advance. The symbol sequence specifying section 103 reads the code conversion start position data from the memory, and starts specifying a pattern symbol sequence from 2d symbols at a position indicated by the code conversion start position data, in Step S102 in FIG. 2.

As mentioned above, the code converting apparatus 100 of this embodiment may be characterized with the code conversion start position data stored therein.

This may substantially equalize the number of times the sequence patterns are used, thereby allowing the noise in the code converted signal to be equalized.

Embodiment 5

If the order of the appearance of each sequence pattern included in the sequence patterns $p_i$ is fixed (e.g., in the case of a GPS signal), the code converting apparatus 100 may execute the code conversion process using a code conversion table. This may accelerate the code conversion process if the code converting apparatus 100 is implemented by the CPU 215 and the ROM 216. Thus, in a fifth embodiment, the signal inputting section 101 inputs the baseband signal into a code conversion table in which the symbol sequence memory section 102 and the symbol sequence specifying section 103 are implemented in Step S101 in FIG. 2. The code conversion table outputs a partial signal to be added by the signal generating section 104 for each sequence pattern by using the baseband signal inputted by the signal inputting section 101, in Step S102 in FIG. 2. The signal generating section 104 generates the pattern signal by adding the partial signal outputted from the code conversion table for each sequence pattern, in Step S103 in FIG. 2.

Thus, the code converting apparatus 100 of this embodiment may be characterized in that the code conversion process is carried out using the code conversion table.

This may enable an accelerated execution of the code conversion process.

BRIEF DESCRIPTION OF THE DRAWINGS

FIG. 3 shows a pseudo program illustrating an example algorithm for permutation of sequence patterns according to the first embodiment;

Figure 1:
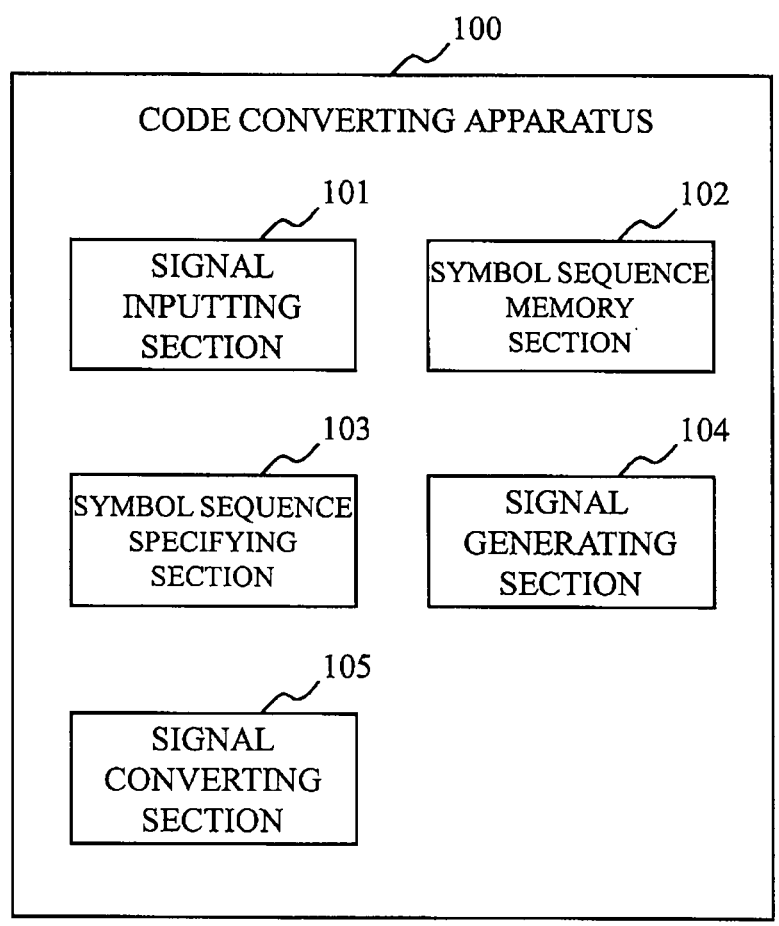
FIG. 1 shows a block diagram illustrating a configuration of a code converting apparatus according to a first embodiment.
Figure 2:
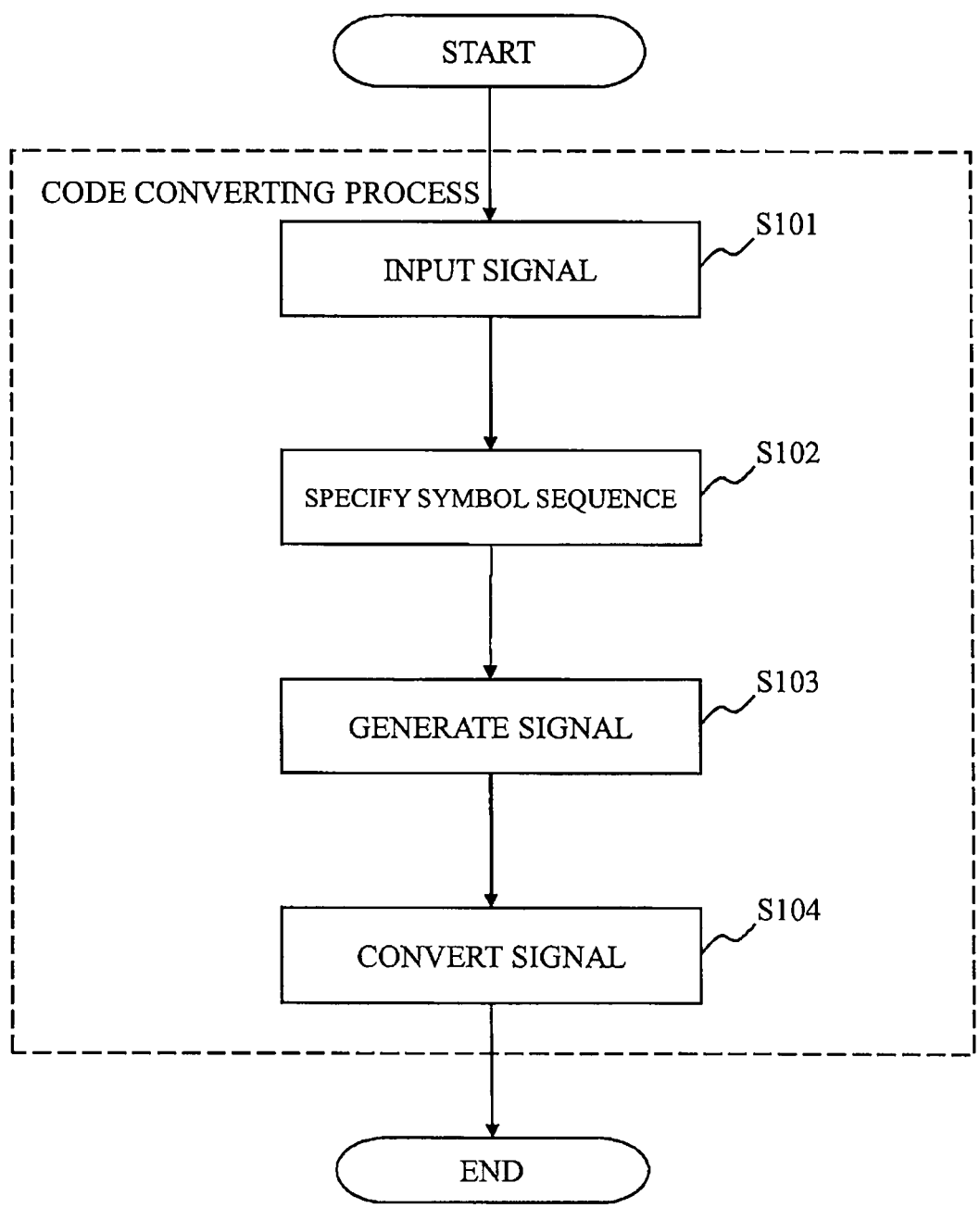
FIG. 2 shows a flowchart illustrating an operation of the code converting apparatus according to the first embodiment.
Figure 4:
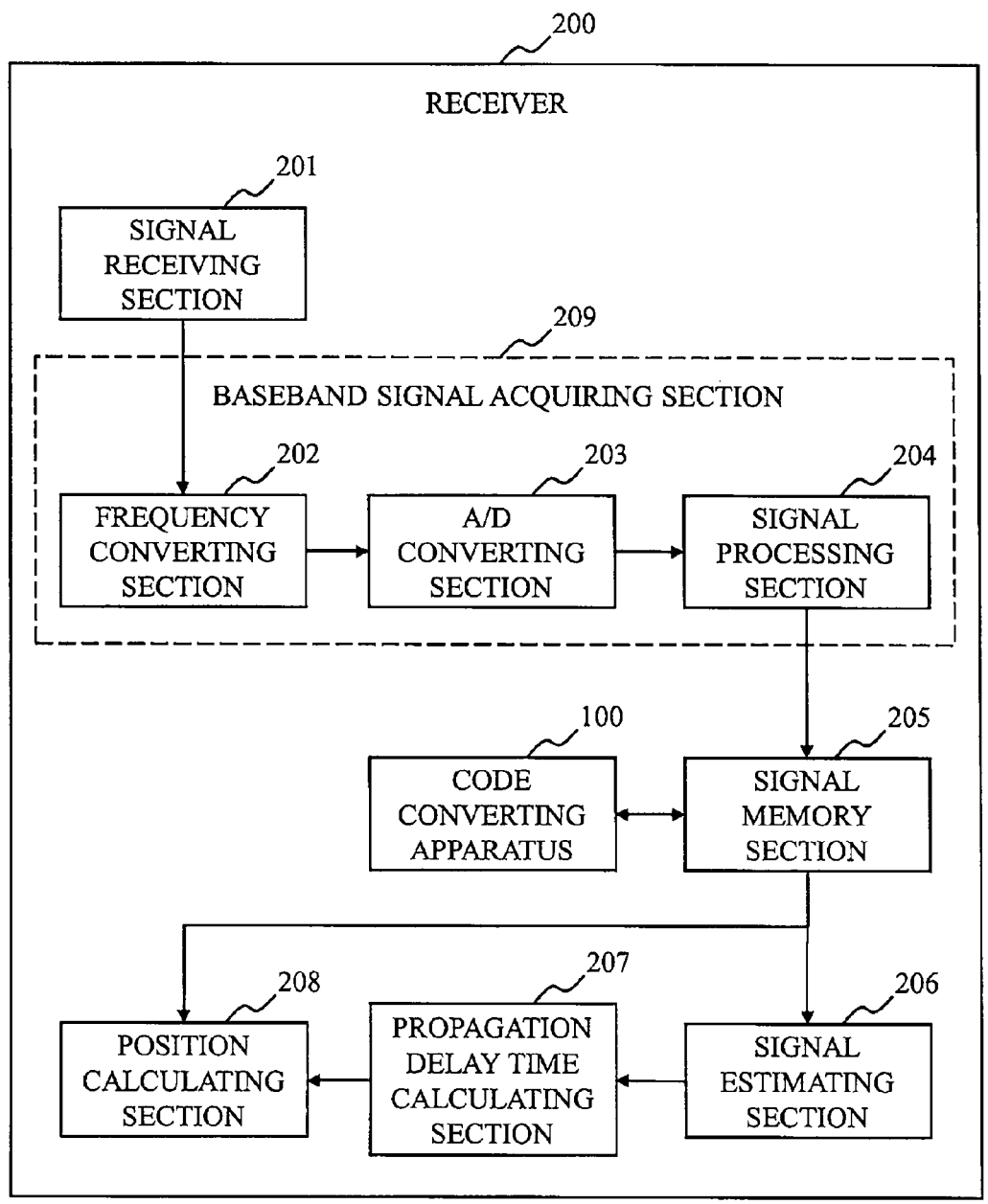
FIG. 4 shows a block diagram illustrating a configuration of a receiver according to a second embodiment.
Figure 5:
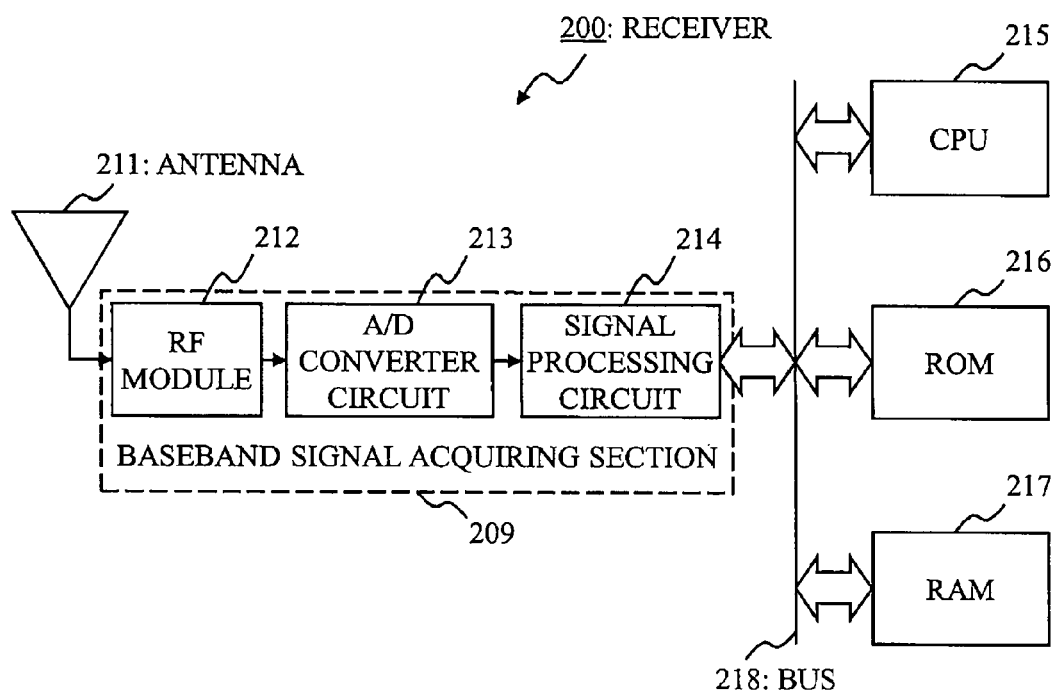
FIG. 5 shows a block diagram illustrating an example of a hardware configuration of the receiver according to the second embodiment.
Figure 6:
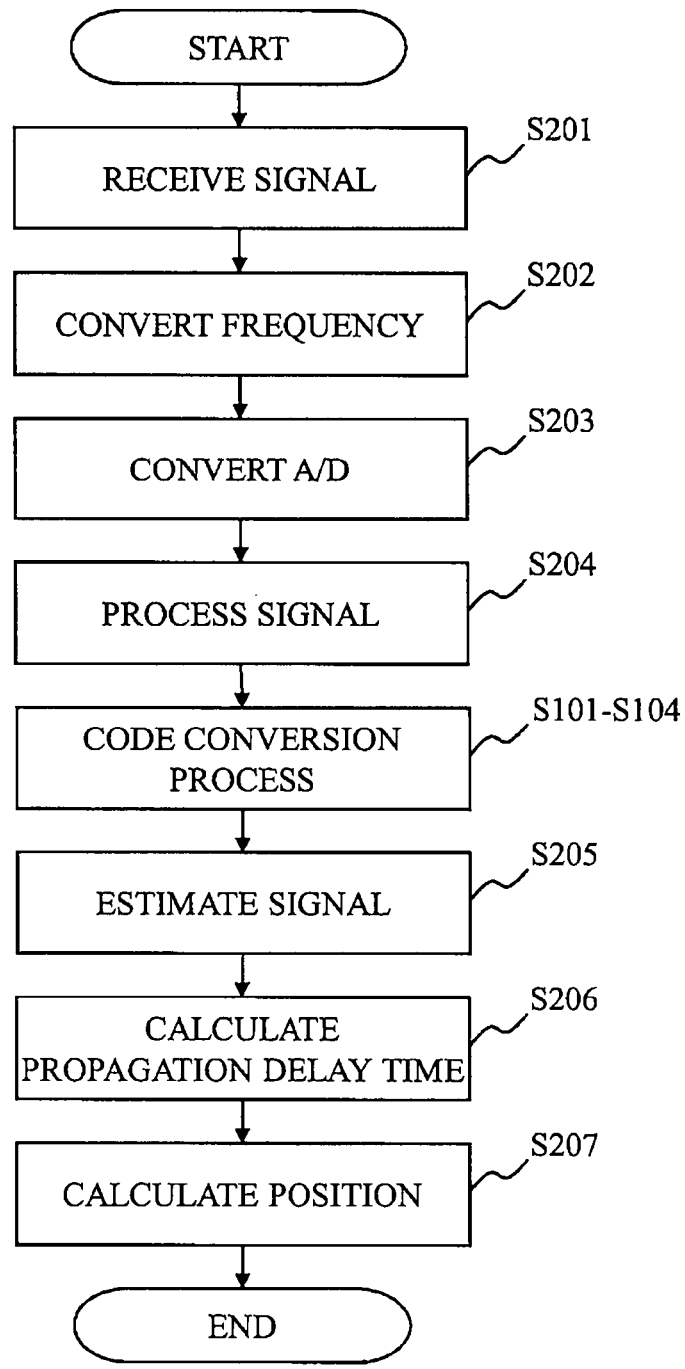
FIG. 6 shows a flowchart illustrating an operation of the receiver according to the second embodiment.
Figure 7:
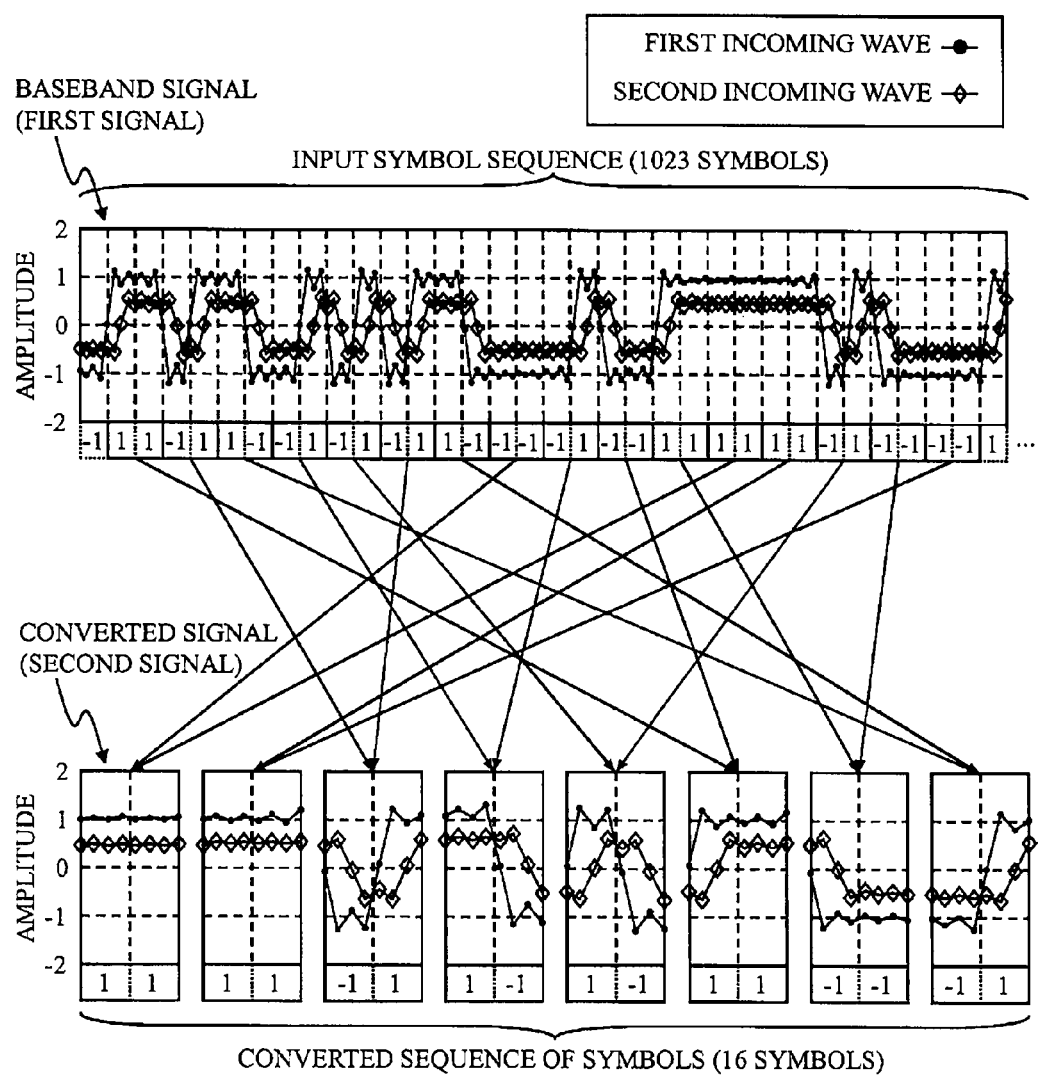
FIG. 7 illustrates an example process of conversion from a first signal to a second signal according to the second embodiment.

| Explanation of Reference Numerals | |
| --- | --- |
| 100 | code converting apparatus |
| 101 | signal inputting section |
| 102 | symbol sequence memory section |
| 103 | symbol sequence specifying section |
| 104 | signal generating section |
| 105 | signal converting section |
| 200 | receiver |
| 201 | signal receiving section |
| 202 | frequency converting section |
| 203 | A/D converting section |
| 204 | signal processing section |
| 205 | signal memory section |
| 206 | signal estimating section |
| 207 | propagation delay time calculating section |
| 208 | position calculating section |
| 209 | baseband signal acquiring section |
| 211 | antenna |
| 212 | RF module |
| 213 | A/D converter circuit |
| 214 | signal processing circuit |
| 215 | CPU |
| 216 | ROM |
| 217 | RAM |
| 218 | bus |

The invention claimed is:

1. A code converting apparatus comprising:

a signal inputting processing circuit configured to input a first signal sampled in a predetermined sampling cycle from a modulation signal modulated by a spreading sequence composed of m elements in a set A having n kinds of symbols as elements where $m \geq 4d$, $d \geq 1$, $n \geq 2$, and m, d and n are integers;

a symbol sequence memory configured to store a converted sequence of symbols obtained by concatenating consecutive 2d symbols at the center of each of $n^{4d}$ kinds of sequence patterns, each sequence pattern being composed of 4d elements in the set A, the converted sequence of symbols being structured so that d symbol immediately preceding the 2d symbols and d symbol immediately following the 2d symbols are identical to d symbol immediately preceding corresponding 2d symbols and d symbol immediately following the corresponding 2d symbols of a corresponding sequence pattern;

a symbol sequence specifying processing circuit configured to specify a sequence pattern matching a partial sequence composed of the 2d symbols, the d symbol immediately preceding the 2d symbols and the d symbol immediately following the 2d symbols, among the sequence patterns, for every consecutive 2d symbols included in an input symbol sequence $x_1 \, x_2 \ldots x_m$ obtained by assigning a symbol to the first signal inputted by the signal inputting processing circuit in a coding cycle of the spreading sequence;

a signal generating processing circuit configured to generate a pattern signal for each sequence pattern specified by the symbol sequence specifying processing circuit for every consecutive 2d symbols included in the input symbol sequence, by adding a partial signal that is a portion to which the 2d symbols are assigned of the first signal inputted by the signal inputting processing circuit; and a signal converting processing circuit configured to generate a second signal by concatenating each pattern signal generated by the signal generating processing circuit for each sequence pattern, in an order equivalent to an order of the 2d symbols at the center of each sequence pattern concatenated in the converted sequence of symbols stored in the symbol sequence memory.

2. The code converting apparatus according to claim 1, wherein the symbol sequence memory sets the sequence patterns $p_i = b_{i,1} \, b_{i,2} \ldots b_{i,4d}$ where $i=1, 2, \ldots, n^{4d}$ so that $b_{k,2d+1} \, b_{k,2d+2} \ldots b_{k,4d} = b_{k+1,1} \, b_{k+1,2} \ldots b_{k+1,2d}$ where $k=1, 2, \ldots, n^{4d}-1$ and $$b_{n^{4d},2d+1} \, b_{n^{4d},2d+2} \ldots b_{n^{4d},4d} = b_{1,1} \, b_{1,2} \ldots b_{1,2d},$$

and stores the converted sequence of symbols $$c_1 \, c_2 \ldots c_{2dn^{4d}} = b_{1,d+1} \, b_{1,d+2} \ldots b_{1,3d} \, b_{2,d+1} \ldots b_{2,3d} \ldots b_{n^{4d},d+1} \ldots b_{n^{4d},3d}$$

obtained by concatenating the 2d symbols at the center of each of the sequence patterns $p_i$ in an ascending order of i.

3. The code converting apparatus according to claim 2, wherein the signal inputting processing circuit inputs the first signal sampled in the predetermined sampling cycle from the modulation signal modulated by the spreading sequence composed of m elements in the set $A = -1, 1$ where $n=2$, the symbol sequence memory sets the sequence patterns which are the permutated sequence patters of $p_i = b_{i,1} \, b_{i,2} \, b_{i,3} \, b_{i,4}$ where $b_{i,1}=1$, $i=1, 2, \ldots, 8$, and $d=1$ so that $b_{k,3} \, b_{k,4} = b_{k+1,1} \, b_{k+1,2}$ where $k=1, 2, \ldots, 7$ and $b_{8,3} \, b_{8,4} = b_{1,1} \, b_{1,2}$, while allowing inversion (i.e., a replacement with $p_i = -b_{i,1} \, -b_{i,2} \, -b_{i,3} \, -b_{i,4}$), and stores the converted sequence of symbols $c_1 \, c_2 \ldots c_{16} = b_{1,2} \, b_{1,3} \, b_{2,2} \, b_{2,3} \ldots b_{8,2} \, b_{8,3}$ obtained by concatenating consecutive two symbols at the center of each of the sequence patterns p, in the ascending order of i, the symbol sequence specifying processing circuit specifies each sequence pattern matching one of the partial sequence composed of the two symbols, one symbol immediately preceding the two symbols and one symbol immediately following the two symbols, and an inverted sequence obtained by inverting the symbols of the partial sequence, among the sequence patterns $p_i$, for every consecutive two symbols included in the input symbol sequence, and the signal generating processing circuit generates the pattern signal for each sequence pattern specified by the symbol sequence specifying processing circuit for every consecutive two symbols included in the input symbol sequence, by inverting the partial signal that is the portion to which the two symbols are assigned of the first signal inputted by the signal inputting processing circuit if a corresponding sequence pattern is specified by the symbol sequence specifying processing circuit as a sequence pattern matching the inverted sequence and by adding the partial signal.

4. The code converting apparatus according to claim 1, wherein the signal generating processing circuit adds a substantially equal number of partial signals for each sequence pattern.

5. The code converting apparatus according to claim 1, wherein the signal inputting processing circuit inputs the first signal to a code conversion table in which the symbol sequence memory and the symbol sequence specifying processing circuit are implemented, the code conversion table outputs the partial signal to be added by the signal generating processing circuit for each sequence pattern based on the first signal inputted by the signal inputting processing circuit, and the signal generating processing circuit generates the pattern signal for each sequence pattern by adding the partial signal outputted by the code conversion table.

6. A receiver comprising:

a signal receiving processing circuit configured to receive a modulation signal modulated by a spreading sequence composed of m elements in a set A having n kinds of symbols as elements where $m \geq 4d$, $d \geq 1$, $n \geq 2$, and m, d and n are integers;

a baseband signal acquiring processing circuit configured to generate a first signal of a baseband signal as a digital signal sampled from the modulation signal received by the signal receiving processing circuit in a predetermined sampling cycle;

a signal inputting processing circuit configured to input the first signal generated by the baseband signal acquiring processing circuit;

a symbol sequence memory configured to store a converted sequence of symbols obtained by concatenating consecutive 2d symbols at the center of each of $n^{4d}$ kinds of sequence patterns, each sequence pattern being composed of 4d elements in the set A, the converted sequence of symbols being structured so that d symbol immediately preceding the 2d symbols and d symbol immediately following the 2d symbols are identical to d symbol immediately preceding corresponding 2d symbols and d symbol immediately following the corresponding 2d symbols of a corresponding sequence pattern;

a symbol sequence specifying processing circuit configured to specify a sequence pattern matching a partial sequence composed of the 2d symbols, the d symbol immediately preceding the 2d symbols and the d symbol immediately following the 2d symbols, among the sequence patterns for every consecutive 2d symbols included in an input symbol sequence $x_1$ $x_2$ . . . $x_m$ obtained by assigning a symbol to the first signal inputted by the signal inputting processing circuit in a coding cycle of the spreading sequence;

a signal generating processing circuit configured to generate a pattern signal by adding a partial signal that is a portion to which the 2d symbols are assigned of the first signal inputted by the signal inputting processing circuit, for each sequence pattern specified by the symbol sequence specifying processing circuit for every consecutive 2d symbols included in the input symbol sequence; and a signal converting processing circuit configured to generate a second signal by concatenating each pattern signal generated by the signal generating processing circuit for each sequence pattern, in an order equivalent to an order of the 2d symbols at the center of each sequence pattern concatenated in the converted sequence of symbols stored in the symbol sequence memory.

7. The receiver according to claim 6, wherein
the baseband signal acquiring processing circuit determines a start position of the input symbol sequence by calculating a correlation between the first signal and a symbol sequence sampled from the spreading sequence in the predetermined sampling cycle, and
the symbol sequence specifying processing circuit specifies each sequence pattern for every consecutive 2d symbols at and immediately following the start position calculated by the baseband signal acquiring processing circuit.

8. The receiver according to claim 6, wherein the baseband signal acquiring processing circuit sets or converts the predetermined sampling cycle so that a sampling frequency is an integral multiple of a code frequency of the spreading sequence.

9. The receiver according to claim 6, further comprising a signal estimating processing circuit configured to calculate at least one of amplitude, phase, and delay of the second signal generated by the signal converting processing circuit as amplitude, phase, and delay, respectively, of the first signal inputted by the signal inputting processing circuit.

10. The receiver according to claim 9, wherein
the signal inputting processing circuit inputs the first signal containing a multipath wave, and
the signal estimating processing circuit estimates multipath in the first signal by calculating at least one of the amplitude, phase, and delay of the second signal generated by the signal converting processing circuit.

11. A code converting method comprising:

inputting by a processor a first signal sampled in a predetermined sampling cycle from a modulation signal modulated by a spreading sequence composed of m elements in a set A having n kinds of symbols as elements where $m \geq 4d$, $d \geq 1$, $n \geq 2$, and m, d and n are integers;

storing by a memory a converted sequence of symbols obtained by concatenating consecutive 2d symbols at the center of each of $n^{4d}$ kinds of sequence patterns, each sequence pattern being composed of 4d elements in the set A, the converted sequence of symbols being structured so that d symbol immediately preceding the 2d symbols and d symbol immediately following the 2d symbols are identical to d symbol immediately preceding corresponding 2d symbols and d symbol immediately following the corresponding 2d symbols of a corresponding sequence pattern;

specifying by the processor a sequence pattern matching a partial sequence composed of the 2d symbols, the d symbol immediately preceding the 2d symbols and the d symbol immediately following the 2d symbols, among the sequence patterns, for every consecutive 2d symbols included in an input symbol sequence $x_1$ $x_2$ . . . $x_m$ obtained by assigning a symbol to the first signal in a coding cycle of the spreading sequence;

generating by the processor a pattern signal by adding a partial signal that is a portion to which the 2d symbols are assigned of the first signal, for each sequence pattern specified for every 2d symbols included in the input symbol sequence; and generating by the processor a second signal by concatenating each pattern signal generated for each sequence pattern, in an order equivalent to an order of the 2d symbols at the center of each sequence pattern concatenated in the converted sequence of symbols stored in the memory.

* * * * *